US006606913B1

(12) United States Patent
Gianchandani

(10) Patent No.: US 6,606,913 B1
(45) Date of Patent: Aug. 19, 2003

(54) MICROMACHINED STRAIN SENSOR

(75) Inventor: Yogesh B. Gianchandani, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/232,092

(22) Filed: Jan. 15, 1999

Related U.S. Application Data

(60) Provisional application No. 60/107,423, filed on Nov. 6, 1998.

(51) Int. Cl.[7] .............................. G01B 7/16; G01L 1/00
(52) U.S. Cl. ....................................................... 73/777
(58) Field of Search .......................... 73/777, 767, 781, 73/105, 514.32, 514.16, 514.18, 504.16, 862.59

(56) References Cited

U.S. PATENT DOCUMENTS

| | | | |
|---|---|---|---|
| 4,897,360 A | | 1/1990 | Guckel et al. |
| 5,565,625 A | | 10/1996 | Howe et al. |
| 5,583,290 A | * | 12/1996 | Lewis ...................... 73/514.18 |
| 5,610,335 A | | 3/1997 | Shaw et al. |
| 5,616,514 A | * | 4/1997 | Muchow et al. ............... 73/777 |
| 5,640,039 A | | 6/1997 | Chau et al. |
| 5,646,347 A | * | 7/1997 | Weiblin et al. .......... 73/514.32 |
| 5,747,705 A | * | 5/1998 | Herb et al. ............... 73/862.59 |
| 5,763,782 A | * | 6/1998 | Moore et al. ............ 73/514.18 |
| 5,767,405 A | | 6/1998 | Bernstein et al. |
| 5,786,621 A | * | 7/1998 | Saif et al. .................... 257/415 |
| 6,046,067 A | * | 4/2000 | Werner ..................... 73/514.23 |

FOREIGN PATENT DOCUMENTS

WO    WO 96/05492    2/1996

OTHER PUBLICATIONS

Tabata, et al., "Mechanical Property Measurements of Thin Films Using Load–Deflection of Composite Rectangular Membrane," Proc., IEEE Intl. Workshop on Microelectromechanical Systems (MEMS '89), pp. 152–156, Jan. 1989.

(List continued on next page.)

*Primary Examiner*—Hezron Williams
*Assistant Examiner*—Octavia Davis
(74) *Attorney, Agent, or Firm*—Foley & Lardner

(57) ABSTRACT

A micromachined strain sensor can be incorporated in a sealed package with other microelectrical and micromechanical components, with the residual strain being monitored electronically from outside the package to allow strain to be monitored during production and during the life of the component. The strain sensor includes at least one microstructural beam member anchored to a substrate at one position and having a portion which is freed from the substrate during formation to displace as a result of the strain in the beam member. At least one electrically conductive displaceable tine is connected to the beam member to be displaced as it is freed. A mating electrically conductive tine is mounted to the substrate adjacent to the displaceable tine such that a capacitor is formed between the adjacent tines. A plurality of displaceable tines and mating tines may be formed to increase the overall capacitance of the device. The mating tines and displaceable tines are connected to leads extending from the package to allow the change in capacitance caused by displacement of the beam member to be measured from outside the package. The strain sensors may be configured with the beam members connected to the top and bottoms of support beams that carry the displaceable tines, with multiple structures formed adjacent to each other to increase the overall capacitance of the sensor and to increase the displacement of the tines in response to the built-in compressive or tensile strain in the microstructural material of the beam members, and to allow differential capacitive readout.

22 Claims, 12 Drawing Sheets

OTHER PUBLICATIONS

Gianchandani, et al., "Bent–Beam Strain Sensors," IEEE Journal of Microelectomechanical Systems 5(1), pp. 52–58, Mar. 1996.

Guckel, et al., "Diagnostic Microstructures for the Measurement of Intrinsic Strain in Thin Films," J. of Micromechanics and Microengineering, 2, pp. 86–95, 1992.

Mehregany, et al., "Novel Microstructures for the In Situ Measurement of the Mechanical Properties of Thin Films," J. Appl. Phys. 62 (9), pp. 3579–3584, Nov. 1, 1987.

Lin, et al., "A Micro Strain Guage With Mechanical Amplifier," IEEE J. Microelectromechanical Systems 6(4), pp. 313–321, Dec. 1997.

Wilner, "Strain and Strain Relief in Highly Doped Silicon," Proc., Solid–State Sensor and Actuator Workshop (Hilton Head '92), pp. 76–77, Jun. 1992.

van Drieenhuisen, et al., "Comparison of Techniques for Measuring Both Compressive and Tensile Stress in Thin Films," Sensors and Actuators, A37–38, pp. 756–765, Jun.–Aug. 1993. (Also see Transducers '93).

Najafi, et al., "A Novel Technique and Structure for the Measurement of Intrinsic Stress and Young's Modulus of Thin Films," IEEE Intl. Workshop on Microelectromechanical Systems (MEMS '89), pp. 96–97, Jan. 1989.

Osterberg, et al., "M–TEST: A Test Chip for MEMS Material Property Measurement Using Electrostatically Actuated Test Structures," IEEE Journal of Microelectromechanical Systems, 6(2), pp. 107–118, Jun. 1997.

Alley, et al., "The Effect of Release–Etch Processing on Surface Microstructure Stiction," Proc., Solid–State Sensor and Actuator Workshop (Hilton Head '92), pp. 202–207.

Srinivasan, et al., "Alkyltrichlorosilane–Based Self–Assembled Monolayer Films for Stiction Reduction in Silicon Micromachines," IEEE J. Microelectromechanical Systems, 7(2), pp. 252–260, Jun. 1998.

Gianchandani, et al., "A CMOS Dissolved Wafer Process for Integrated $P^{++}$Microelectromechanical Systems," Published in the Proceedings, International Conference on Solid–State Sensors and Actuators, Stockholm, Sweden, Jun. 1995.

Goosen, et al., "Stress Measurement Structures for Micromachined Sensors," The $7^{th}$ International Conference on Solid–State Sensors and Actuators, pp. 783–786.

Gianchandani, et al., "A Bulk Silicon Dissolved Wafer Process for Microelectromechanical Devices," Journal of Microelectromechanical Systems, vol. 1, No. 2, Jun., 1992, pp. 77–85.

Liwei Lin, et al., "A Passive, In Situ Micro Strain Gauge," IEEE Proceedings of the Workshop on Micro Electro Mechanical Systems, Ft. Lauderdale, Florida, Feb. 7–10, 1993, pp. 201–206.

L. Elbrecht, et al., "Highly Phosphorus–Doped Polysilicon Films with Low Tensile Stress for Surface Micromachining Using POC13 Diffusion Doping," Sensors and Actuators A, vol. 61, No. 1–3, Jun., 1997, pp. 374–378.

* cited by examiner

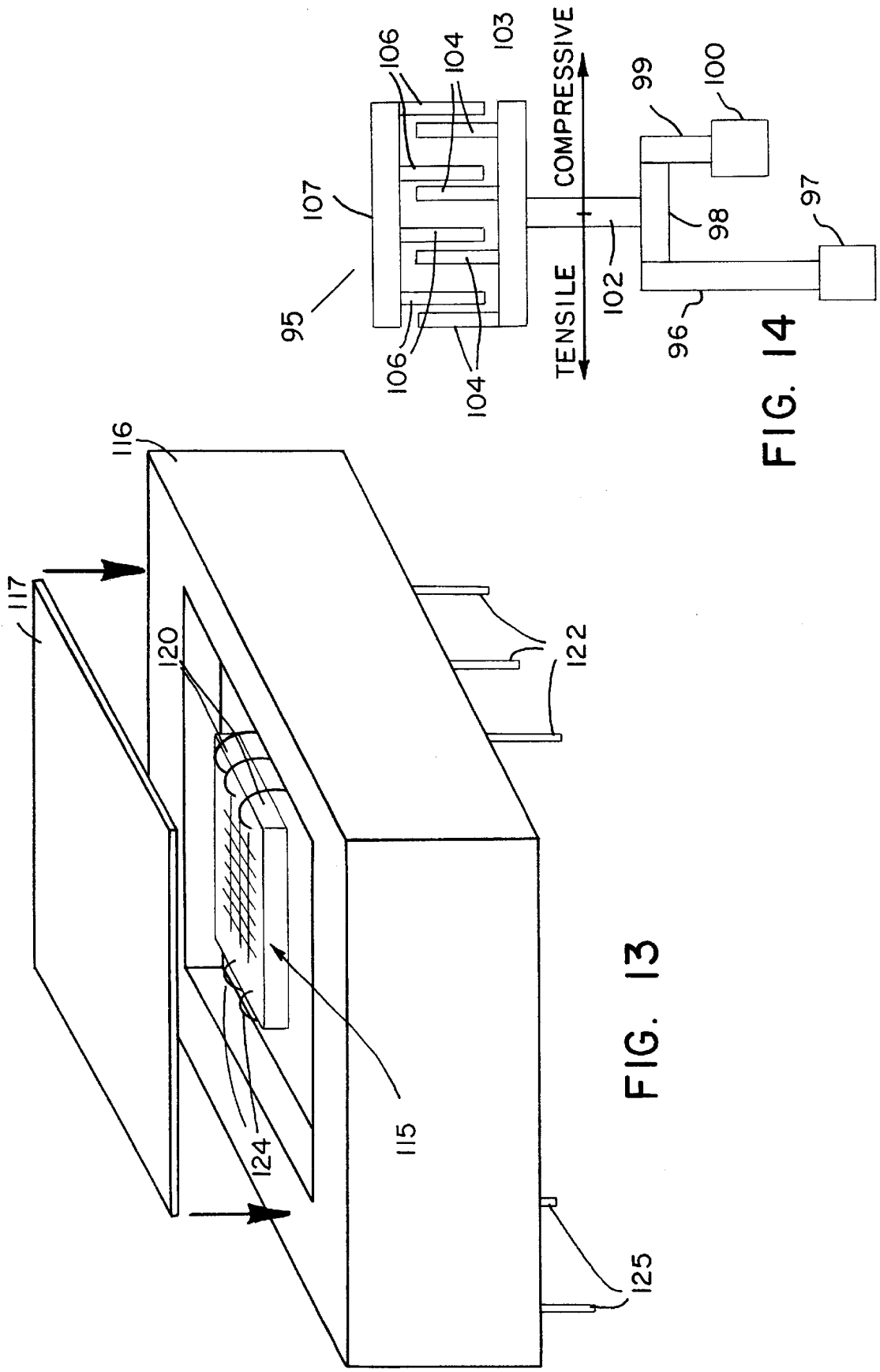

MICROMACHINED STRAIN SENSOR

This application claims the benefit of provisional patent application No. 60/107,423, filed Nov. 6, 1998.

FIELD OF THE INVENTION

This invention pertains generally to the field of micromechanical structures and processes for producing such structures.

BACKGROUND OF THE INVENTION

Photolithographic techniques similar to those used in semiconductor processing have been applied to the formation of micromechanical and microelectrical mechanical (MEMS) structures. In the lithographic processes used for producing such structures, a particular challenge is the control of the residual strain in the formed structures. For example, residual compressive strain in freed structures such as bridges, cantilevers and diaphragms can result in unwanted deflection or distortion of such structures. The residual strain is affected by a number of manufacturing parameters, and small changes in such parameters can significantly impact the performance of the micromechanical devices. For example, a capacitive pressure sensor with a diaphragm that is 2 $\mu$m thick and 2mm on the side will lose sensitivity by a factor of 25 for residual tensile stress of just 30 MPa. Residual stress is affected not only by manufacturing parameters such as deposition temperature, pressure, precursor concentrations, post-anneal conditions, etc., but also by packaging variables such as die attach materials, and deployment conditions such as operating temperature and humidity. A number of micromachined strain sensors have been developed in the past to monitor this important material property with the dimensional resolution of a few hundreds microns. Although some of these require mechanical actuation (See O. Tabata, K. Kawahata, S. Sugiyama, I. Igarashi, "Mechanical property measurements of thin films using load-deflection of composite rectangular membrane," MEMS '89, pp. 152–156, 1989), most involve passive structures that are designed to deform measurably under the residual stress when they are released from the substrate. The measurement and control of residual strain is particularly significant in the formation of polysilicon microstructures, as carried out, for example, in U.S. Pat. No. 4,897,360, which also discusses strain sensitive structures that may be used to assess the level of residual strain in the formed materials. See also Y. B. Gianchandani and K. Najafi, "Bent-Beam Strain Sensors," JMEMS 5(1), pp. 52–58, March, 1996; H. Guckel, D. Burns, C. Rutigliano, E. Lovell, B. Choi, "Diagnostic microstructures for the measurement of intrinsic strain in thin films," J. Micromech. Microeng., 2, pp. 86–95, 1992; M. Mehregany, R. Howe, S. Senturia, "Novel microstructures for the in situ measurement of the mechanical properties of thin films," J. Appl. Phys. 62 (9), pp. 3579–3584, Nov. 1, 1987; L. Lin, R. Howe, A. Pisano, "A passive in situ micro strain gauge," MEMS '93, pp. 201–206, 1993; L. B. Wilner, "Strain and strain relief in highly doped silicon," Hilton Head '92, pp. 76–77, June 1992; J. F. L. Goosen, B. P. van Drieenhuisen, P. J. French, R. F. Wolffenbuttel, "Stress measurement structures for micromachined sensors," Transducers '93, July 1993. These deformations are measured visually, sometimes using a micromachined vernier. Although convenient in a laboratory setting, this method is not amenable to high volume manufacturing. More importantly, it renders the device useless for post-packaging or post-deployment readout, eliminating many conceivable applications.

If a strain sensor with electronic readout could be co-fabricated or co-packaged with another device such as an accelerometer, gyroscope, or pressure sensor, the system accuracy can be improved by offering real-time or test-mode calibration over the lifetime of the system. A method for electronic readout has been developed in which a micromachined bridge is deflected by applying a voltage bias to an electrode located under it, generally to the point that the suspension collapses. K. Najafi, K. Suzuki, "A novel technique and structure for the measurement of intrinsic stress and Young's modulus of thin films," MEMS '89, pp. 96–97; P. M. Osterberg and S. D. Senturia, "M-TEST: A test chip for MEMS material property measurement using electrostatically actuated test structures," JMEMS 6(2), June 1997, pp. 107–118. Its usage is constrained in some cases: (a) the fabrication process must permit the inclusion of the electrode; (b) the vertical deflection (perpendicular to the substrate) might not provide accurate data for devices such as the accelerometers and gyroscopes that are designed to deflect laterally (in-plane), particularly when the structural material is anisotropic, such as single crystal silicon or polysilicon with a preferential grain orientation; (c) stiction forces may prevent recovery from collapse, raising concerns about the lifetime of the device and the repeatability of a measurement; and (d) these structures generally are not suitable for compressive materials since they may buckle and collapse.

SUMMARY OF THE INVENTION

In accordance with the invention, a micromachined strain sensor is provided which can be incorporated with other micromechanical and microelectronic devices on a substrate such as a semiconductor chip. The strain sensor can be incorporated in a sealed package with other microelectrical and micromechanical components with the residual strain monitored electronically from outside the package. The residual strain in the micromechanical structural elements can thus be monitored conveniently and economically in a production environment, and, if desired, can be monitored over the life of the component to account for changes in structural properties of the micromechanical materials due to changes in environmental conditions, such as temperature, as well as effects due to aging. The strain sensors in accordance with the invention are fully compatible with conventional planar micromachining of common micromechanical materials such as polysilicon, without requiring significant additional device forming steps beyond those required for formation of the micromechanical devices.

The micromachined strain sensor of the invention is formed on a substrate, such as a semiconductor wafer, having a top surface. A microstructural beam member of the strain sensor is anchored to the substrate at one position and has a portion which, during formation of the sensor, is freed from the substrate and which extends over the top surface of the substrate. At least one electrically conductive displaceable tine is connected to the microstructural beam member to be displaced by the member as it is freed from the substrate. A mating electrically conductive tine is mounted to the substrate at a position adjacent to the displaceable tine such that a capacitor is formed between the adjacent tines. Preferably, there are a plurality of displaceable tines and a plurality of mating tines, with the sets of displaceable tines and mating tines connected together in parallel to increase the effective overall capacitance. The microstructural member is formed from a microstructural material, such as polysilicon or electroplated metal, which, for example, is deposited on a sacrificial layer on the substrate. Preferably, the intended micromechanical structures are also formed from the same material at the same time. The material from which the microstructural member is formed may have an intrinsic built-in strain, either compressive or tensile, in its as-deposited form on the sacrificial layer. The mating tines are also preferably formed on the sacrificial layer in a position parallel to and adjacent to the displaceable tines at known spaced positions from the displaceable tines. In the typical production of micromechanical devices, the sacrificial layer is etched away, freeing the microstructural member from the substrate except at its anchor position. When so freed, the microstructural member will tend to expand or contract, depending on whether the built-in strain is compressive or tensile, thereby moving the displaceable tines either toward or away from the mating tines and thereby changing the effective capacitance between the sets of displaceable tines and mating tines. The change in capacitance is thus related to the displacement of the displaceable tines and thereby to the built-in strain within the microstructural member.

In one preferred strain sensor configuration, the strain sensor includes an elongated support beam having a longitudinal direction of the beam, with two pairs of microstructural members connected to the support beam, preferably at its ends, at an acute angle thereto, with the ends of the microstructural members opposite to that at which they are connected to the support beam being anchored to the substrate. Preferably, the pairs of microstructural members are connected to the support beam at both the top and bottom ends of the support beam in a "bent" V-configuration to fully suspend the support beam above the surface of the substrate when the beam is freed from the substrate. A plurality of displaceable tines preferably extends outwardly from the support beam at a right angle thereto on both sides of the support beam, and mating tines are preferably formed adjacent to the displaceable tines on both sides of the beam. The support beam, displaceable tines, mating tines, and microstructural beam members are formed from a structural material on a sacrificial layer that has been deposited on the top surface of the substrate or are formed in other conventional microprocessing techniques in which the structures are released after being formed. The structural material (e.g., polysilicon) may, for example, be a layer that is patterned and etched to define the various sensor structures using photolithographic techniques, or the structural material may be metal that is electroplated into a patterned photoresist, and other structural materials, such as single crystal silicon and other semiconductors may be appropriately used in accordance with the invention to produce strain sensor structures. When the sacrificial layer is dissolved or etched away, or the various microstructural parts of the sensor are otherwise freed from the surface of the substrate except at the positions at which the microstructural beam members are anchored to the substrate, the beam members will expand or contract depending on whether the strain in the microstructural parts is compressive or tensile, moving the displaceable tines either closer to or further away from the mating tines. In a preferred embodiment of the invention, the mating tines on opposite sides of support beam are preferably located to be most closely adjacent to opposite sides of the displaceable tines so that displacement of the support beam in one direction brings the displaceable tines closer to the mating tines on one side of the support beam and further away from the mating tines on the other side, allowing the resultant change in capacitance between the displaceable tines and the mating tines on each side of the support beam to be determined by a differential capacitance method to minimize common mode parasitics. To further increase the relative displacement of the tines, and thereby the relative change in capacitance for increased sensitivity, it is preferable that the displaceable tines and the mating tines be formed on complementary structures, i.e., the mating tines are themselves displaceable tines formed on a support beam supported by microstructural member beams which are anchored to the substrate, with the microstructural beam members that support adjacent support beams being oriented in opposite directions so that the adjacent support beams are displaced in opposite directions as the various microstructures are released from the substrate.

In a further preferred sensor structure, microstructural member beams are anchored to a substrate and extend to a connection to a support beam at positions such that expansion or contraction of the microstructural beam members when released from the substrate will pivot the support beam and displace tines connected thereto either toward or away from mating tines mounted to the substrate.

Microelectrical-mechanical devices typically are packaged in an enclosure for use. Examples of such devices are accelerometers, gyroscopes, and pressure sensors. The strain sensors of the invention formed with other micromechanical and electrical devices, on the same or a separate substrate, are also encapsulated within the enclosure. Electrical lead wires extend from electrical connection to the displaceable tines (forming one set of plates of the capacitor) and from the mating tines (which, as noted, may themselves also be displaceable), to lead pins which extend from the package. In this manner, the capacitance between the displaceable tines and the mating tines may be measured electrically from outside the package, allowing the strain in the strain sensors, and thus the built-in strain that will be experienced by other micromechanical structures formed on the substrate, to be monitored from outside the package. Such monitoring allows quality control testing of the packages at the point of manufacture and, if desired, continued monitoring of the strain in the micromechanical devices over the lifetime of the devices to allow compensation for variations in strain caused by changes in temperature, other environmental conditions, and normal aging of the devices. By applying a voltage between the displaceable tines and the mating tines, relative movement between these structures and the microstructural beam members supporting the tines can be driven electrostatically, with the resulting change in capacitance as a function of applied voltage allowing a determination of the Young's modulus for the microstructural members.

Further objects, features and advantages of the invention will be apparent from the following detailed description when taken in conjunction with the accompanying drawings.

BRIEF DESCRIPTION OF THE DRAWINGS

In the drawings:

FIG. 13 is a plan view of a further embodiment of a pivoting strain sensor in accordance with the invention.

FIG. 14 is an illustrative perspective view of a strain sensor co-packaged with other sensors and/or interface circuitry within an enclosure.

DETAILED DESCRIPTION OF THE INVENTION

The present invention comprises a laterally deflecting micromachined structure that can be used to electronically monitor residual stress in MEMS devices and packages. The structure of the present invention complements pull-in bridge devices by providing a differential capacitive readout from a laterally deflecting single-layer structure. Moreover, it is suitable for repeated use over an extended lifetime, since the deflection is produced passively and the structures do not collapse. In contrast to pull-in structures, such devices can be used for compressive as well as tensile strain.

Figure 1:
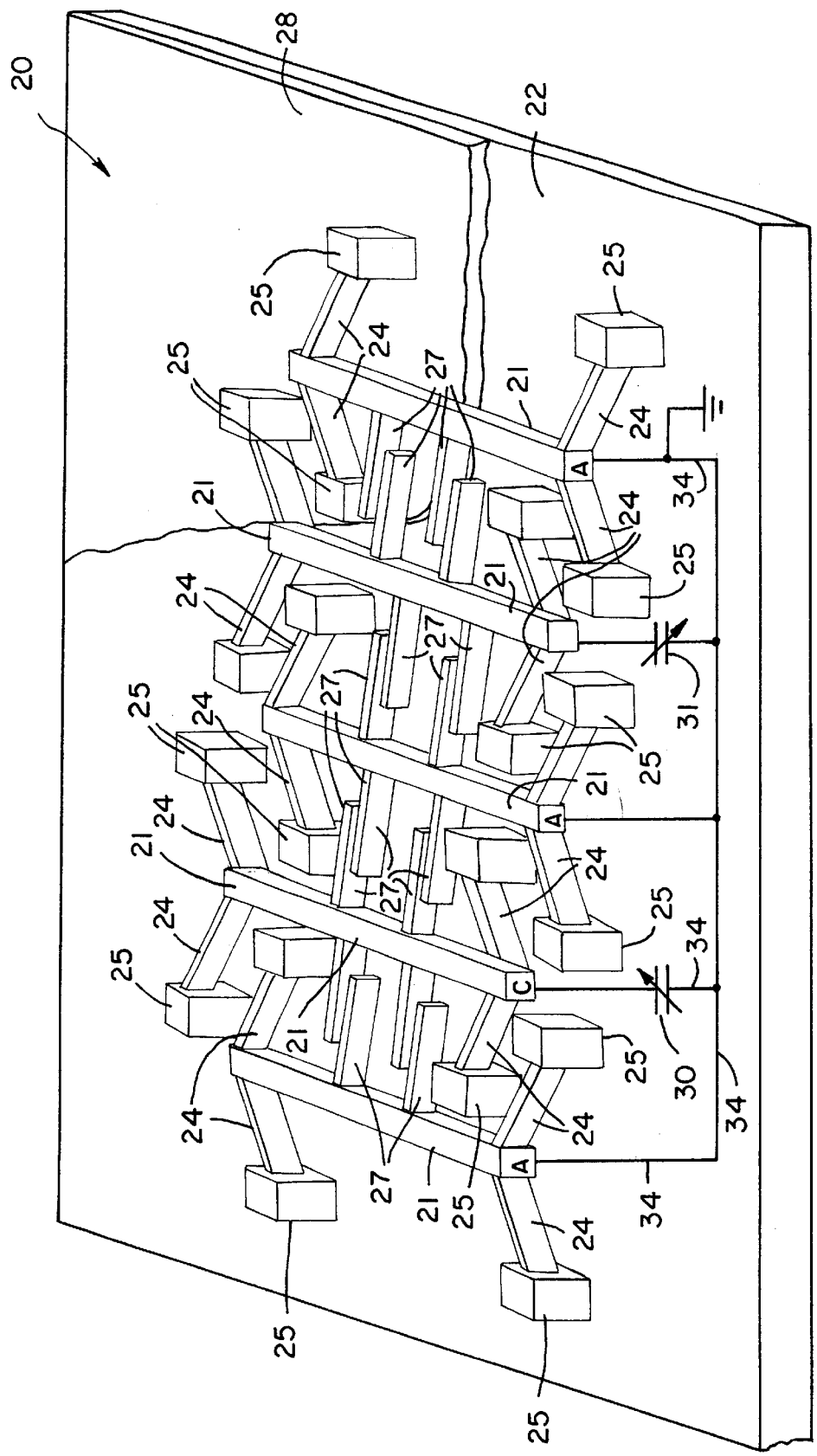
FIG. 1 is an illustrative perspective view of a micromachined strain sensor in accordance with the present invention.

The basic structure of a preferred micromachined strain sensor in accordance with the present invention is shown generally at 20 in FIG. 1. A series of support ribs or beams 21 are suspended above the top surface of a substrate 22 (e.g., single crystal silicon or other semiconductor, glass or another insulator, etc.) by bent-beam suspensions comprising microstructural members 24 joined at one end to the support beam 21 and anchored to the substrate 22 at their other ends at anchor mounts 25. Each pair of beam members 24 define a V-shape or bent beam, and both pairs of beam members 24 at the top and bottom of the support beam are oriented in the same direction. Such structures are excellent transducers for converting both tensile and compressive residual strain to displacement, as described, e.g., in Y. B. Gianchandani and K. Najafi, "Bent-Beam Strain Sensors," JMEMS 5(1), pp. 52–58, March, 1996. The aligned pairs of beam members 24 provide vertical support for the ends of the support beam to fully suspend it above the substrate and resist lateral deflection or twisting of the support beam, while permitting the beam members to expand or contract and thereby move the support beam. The support beams 21 support interdigitated displaceable and mating tines 27 that function as electrodes for the sidewall capacitors. The tines 27 are preferably arranged in a manner such that the capacitance on one side of the device increases as that on the other side decreases. Thus, in response to residual strain in the structural material, the structures including the support beams 21 labeled A in FIG. 1 move in the opposite direction to those structures labeled B and C. This permits a differential readout that is immune to common mode parasitics, e.g., by the switched capacitor charge amplifier method.

The microstructural beam members 24, and preferably also the support beams 21 and displaceable tines 27, are typically deposited on a sacrificial layer 28 (partially shown in FIG. 1) which is formed on the top surface of the substrate 22. In this as-deposited condition, the spacing between the adjacent tines 27 is known, and the nominal capacitance between the adjacent structures is known. When the sacrificial layer 28 is etched away, the displacement of the tines 27 toward or away from each other caused by the stress in the microstructural material of the beam members 24 caused a change in capacitance that can be related to the stress. The material of the sacrificial layer is chosen to be etchable or otherwise removable, typically with an etchant, which does not affect the material of the strain sensor, e.g., silicon dioxide as the sacrificial layer for microstructures of polysilicon.

Preferably, the displaceable tines 27 extend outwardly from the longitudinally elongated support beams 21 at right angles to the support beams. To provide the differential capacitance, the tines 27 on opposite sides of the center support beam 21 are located to be most closely adjacent to opposite sides of the mating tines 27 that extend from the adjacent support beams 21. For example, the tines 27 on the left side of the middle support beam 21 of the structures labeled A in FIG. 1 are below the most closely adjacent mating tines 27 extending from the right side of the support beam 21 of the structure labeled C, while the tines 27 extending from the right side of the support beam of the middle structure A are above the most closely adjacent mating tines 27 extending from the left side of the support beam 21 of the structure labeled B. The outermost displaceable structures labeled A and the central displaceable structure labeled A are electrically connected together such that the displaceable tines 27 of these structures are electrically connected together, and wherein a capacitor is formed between these commonly connected structures and the displaceable structure B on one side of the central structure A and another capacitor is formed between the commonly connected structures and the displaceable structure C on the other side of the central structure, the capacitance of these two capacitors changing in magnitude in opposite directions. Thus, if residual strain causes the C and B structures to move down and the A structures to move up, the A to C tine gaps decrease (increasing capacitance between these structures) while the A to B tine gaps increase (decreasing the capacitance between these structures). The effective capacitance between the A to C structures is illustrated by the (variable) capacitor labeled 30 in FIG. 1 and the effective capacitance between the A to B structures is illustrated by the (variable) capacitor labeled 31 in FIG. 1. Conversely, if the residual strain in the microstructural members 24 is tensile, the A, B and C support beams will move in the opposite direction when freed from the substrate, and the A to C capacitance will decrease while the A to B capacitance will increase. Electrical conductors 34 are connected to the A, B and C microstructures (which are electrically conductive) to allow readout of the capacitance between these structures by external devices (e.g., by forming electroplated metal conductors on an insulating substrate or by appropriately doping a semiconductor substrate).

Although preferred, it is not necessary that all of the microstructures be released from the substrate, or that they all displace in response to built-in strain when released from the substrate. For example, the structures labeled A in FIG. 1 may be released from the substrate, moving the displaceable tines 27 extending from the support beams 21 of the A structures, while the support beams of the structures labeled B and C may remain fixed to the substrate so that the mating tines 27 which are most closely adjacent to the displaceable tines 27 on the A structures do not displace at all. (Of course, for such fixed structures the beam members 24 are not needed and the support beams 21 may be formed directly on the substrate 22).

Figure 2:
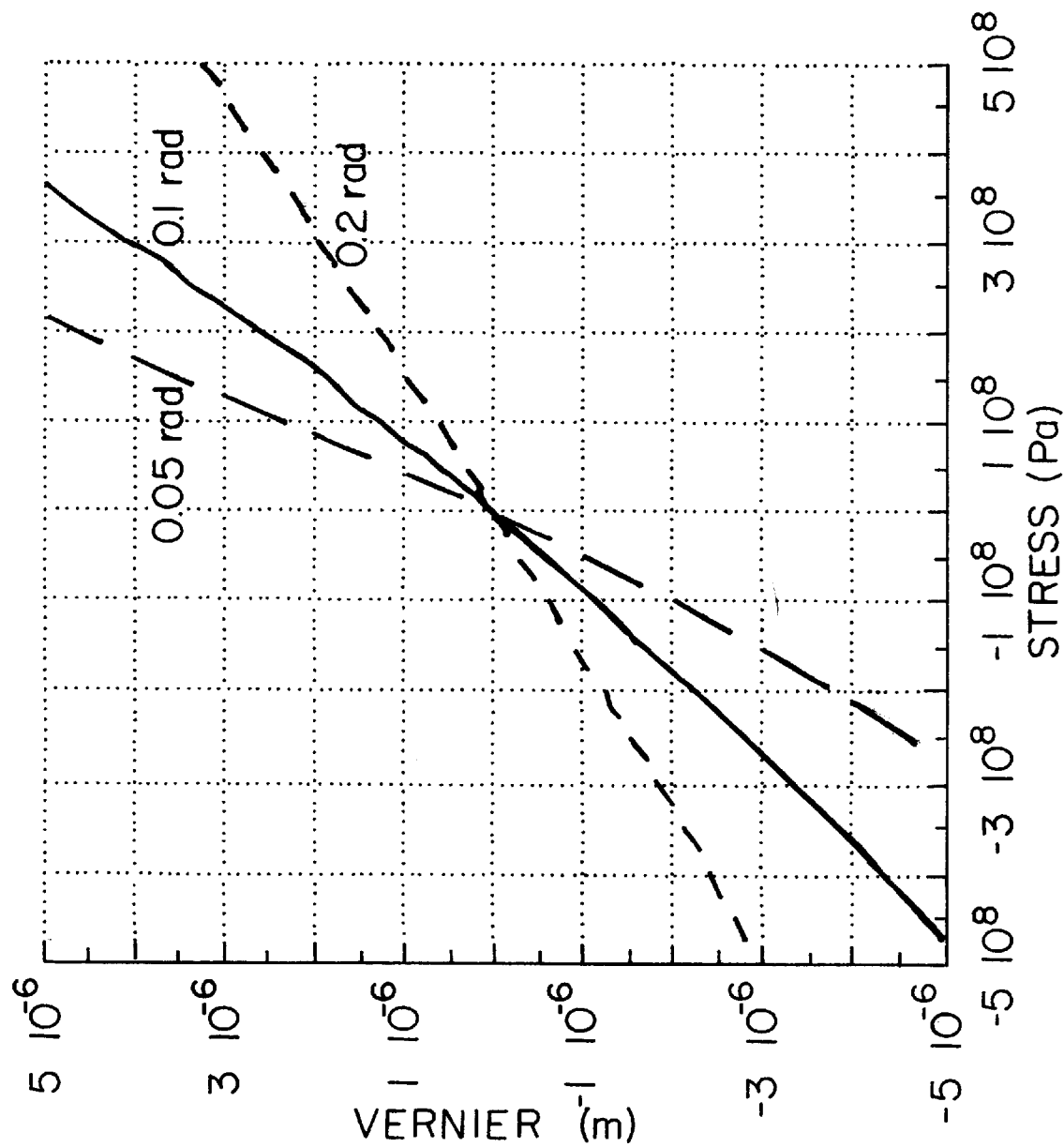
FIG. 2 are graphs showing displacement versus stress for micromachined strain sensors as in FIG. 1 at various bend angles for a 200 $\mu$m long (the distance between the anchors), 2 $\mu$m wide and 1.5 $\mu$m thick bent beam suspension.
Figure 3:
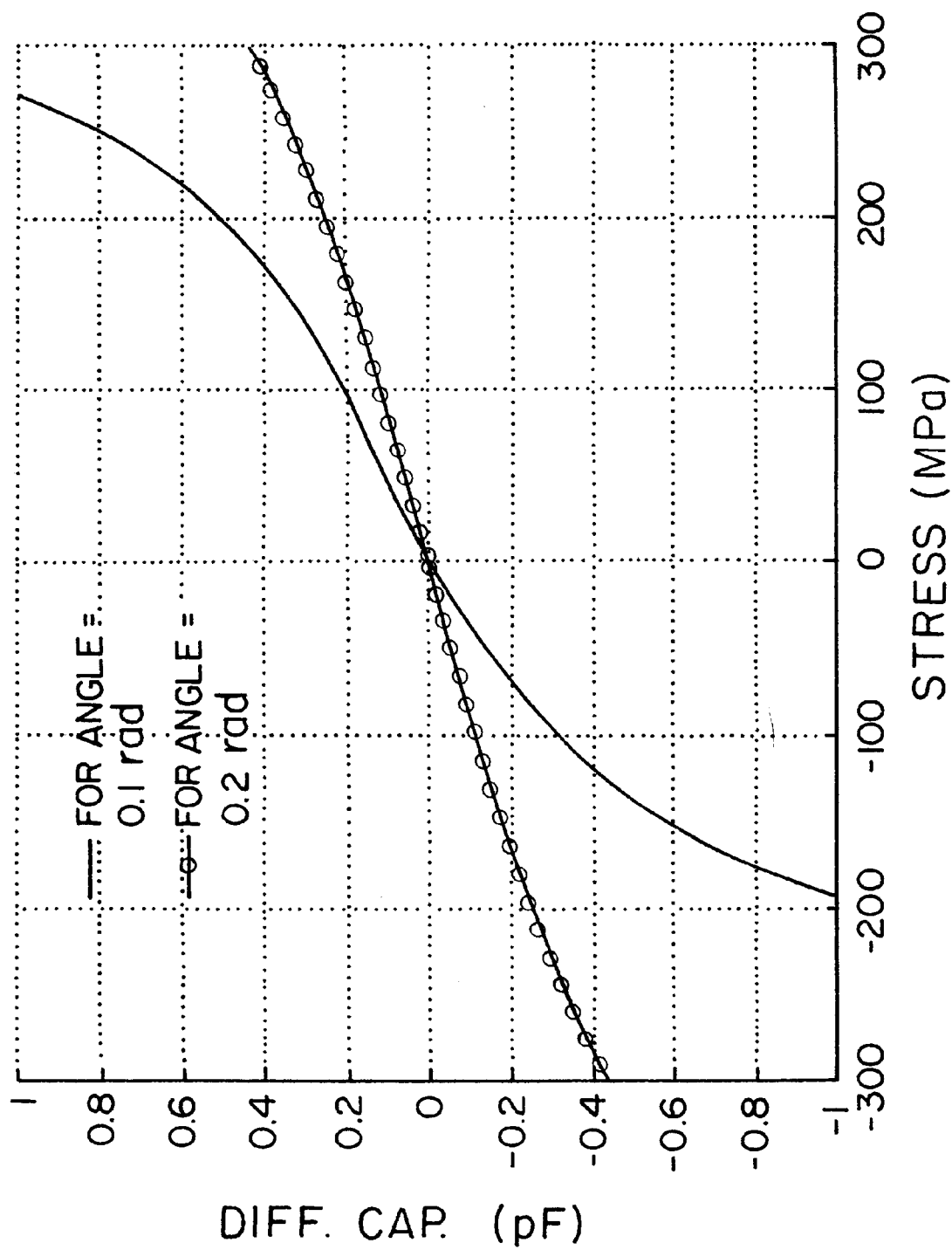
FIG. 3 are graphs showing the differential capacitance versus stress for micromachined strain sensors as in FIG. 1 at two bend angles for 200 $\mu$m long, 5 $\mu$m wide and 4 $\mu$m thick microstructural beam suspensions, with the strain sensor structures having 10 tines per side that are 92 $\mu$m long and 5 $\mu$m wide, and with a nominal gap between tines (before release) of 4 $\mu$m.
Figure 7:
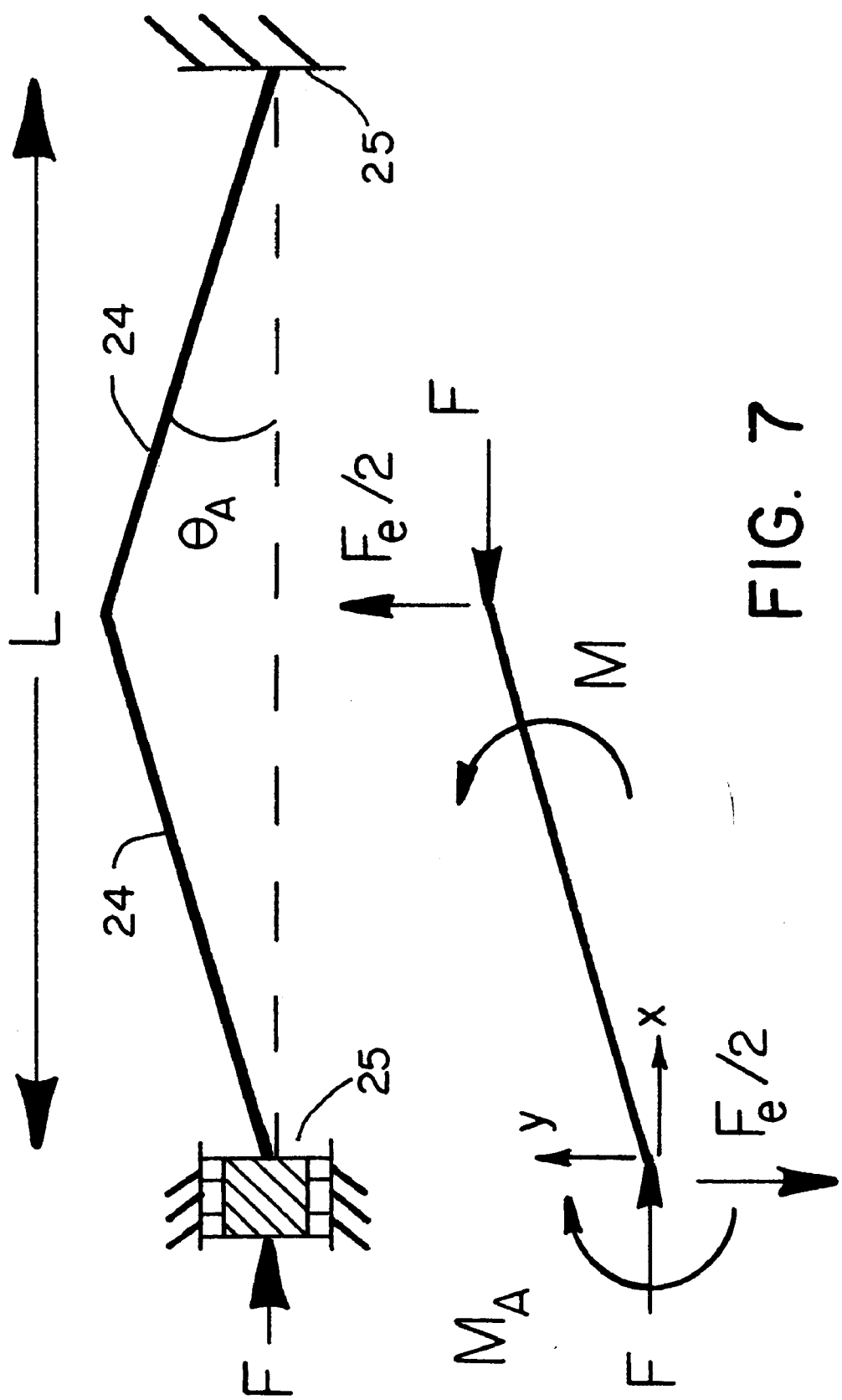
FIG. 7 are diagrams illustrating the forces on a bent microstructural beam suspension of the type shown in FIG. 1 for the micromachined strain sensors of the invention.

The sensitivity and range of the deformation are a function of the bending angle at which the members 24 are joined to the support beam 21 and the dimensions of the suspension, and can be customized to address the needs of a particular application or fabrication process. As an example, the displacement of the adjacent tines 27, calculated analytically and verified by finite element analysis (FEA), is plotted as a function of stress in FIG. 2 for a structure having 200 μm long (the length L between anchors as illustrated in FIG. 7), 2 μm wide and 1.5 μm thick beam members for bend angles (the acute angle at which the members 24 join the support beam 21) of 0.05 radian, 0.1 radian and 0.2 radian. The resultant change in differential capacitance is shown in FIG. 3 for devices having bend angles of 0.1 radian and 0.2 radian and micromechanical beam members 24 that have a suspension length L of 200 μm and are 5 μm wide, and 4 μm thick, with 10 tines per side of the support beams that are 92 μm long, 5 μm wide, and with a nominal initial tine gap (before release from the substrate) of 4 μm. The strain sensor devices have high sensitivity and a wide dynamic range. Devices may be designed to meet specific needs by varying the structural design parameters, with typical sensitivities in the range of 0.1–1 fF/MPa.

Figure 4:
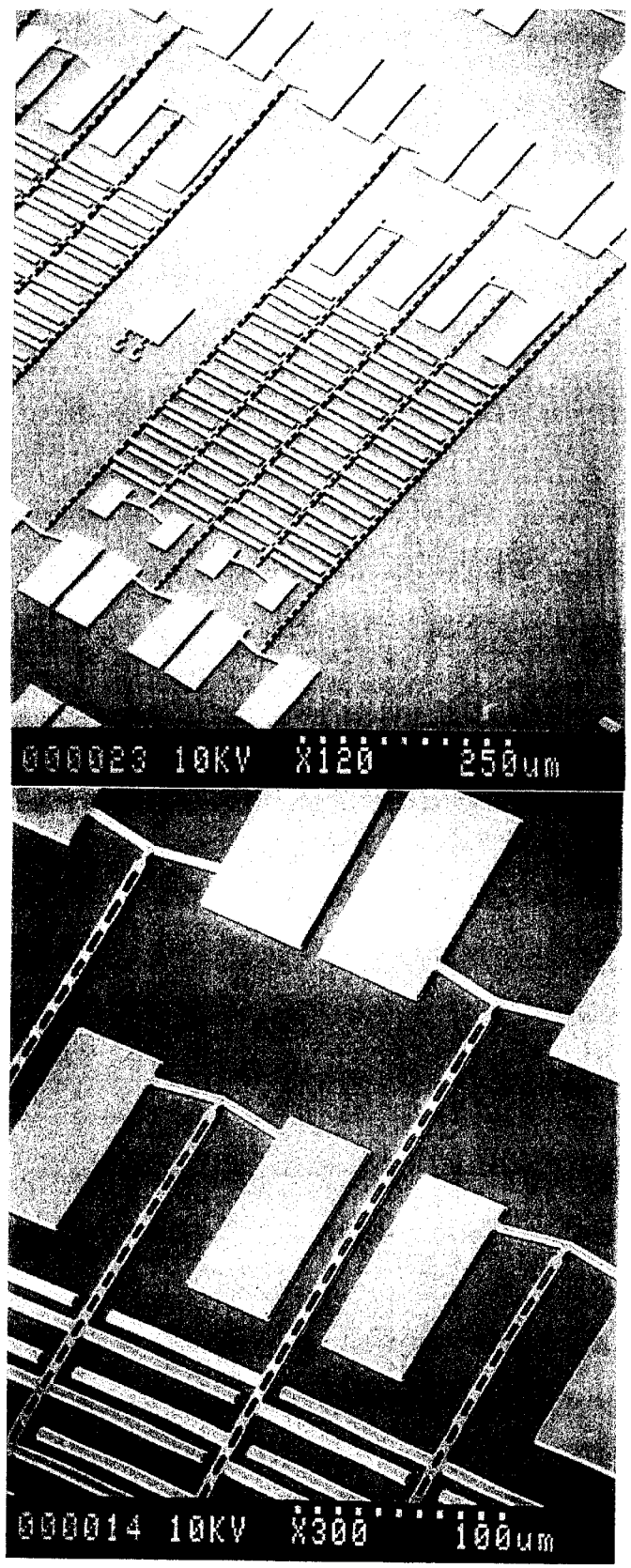
FIG. 4 are scanning electron microscope (SEM) micrographs of unreleased polysilicon strain sensor structures illustrating the equal gaps between tines on both sides of the support beams.

FIG. 4 shows SEM micrographs of unreleased polysilicon strain sensor devices. These devices were fabricated using standard surface micromachining techniques: the structural material is 2.5 μm thick low pressure chemical vapor deposition (LPCVD) polysilicon, a phosphorus implant of 1×10$^{16}$ cm$^2$ to provide electrical conductivity of the polysilicon structures, a 30 min. anneal at 1000° C., BHF release, and a coating of self-assembled monolayers. See R. L. Alley, G. J. Cuan, R. T. Howe, and K. Komvopoulos, "The effect of release-etch processing on surface microstructure stiction," Hilton Head '92, pp. 202–207.

Figure 5:
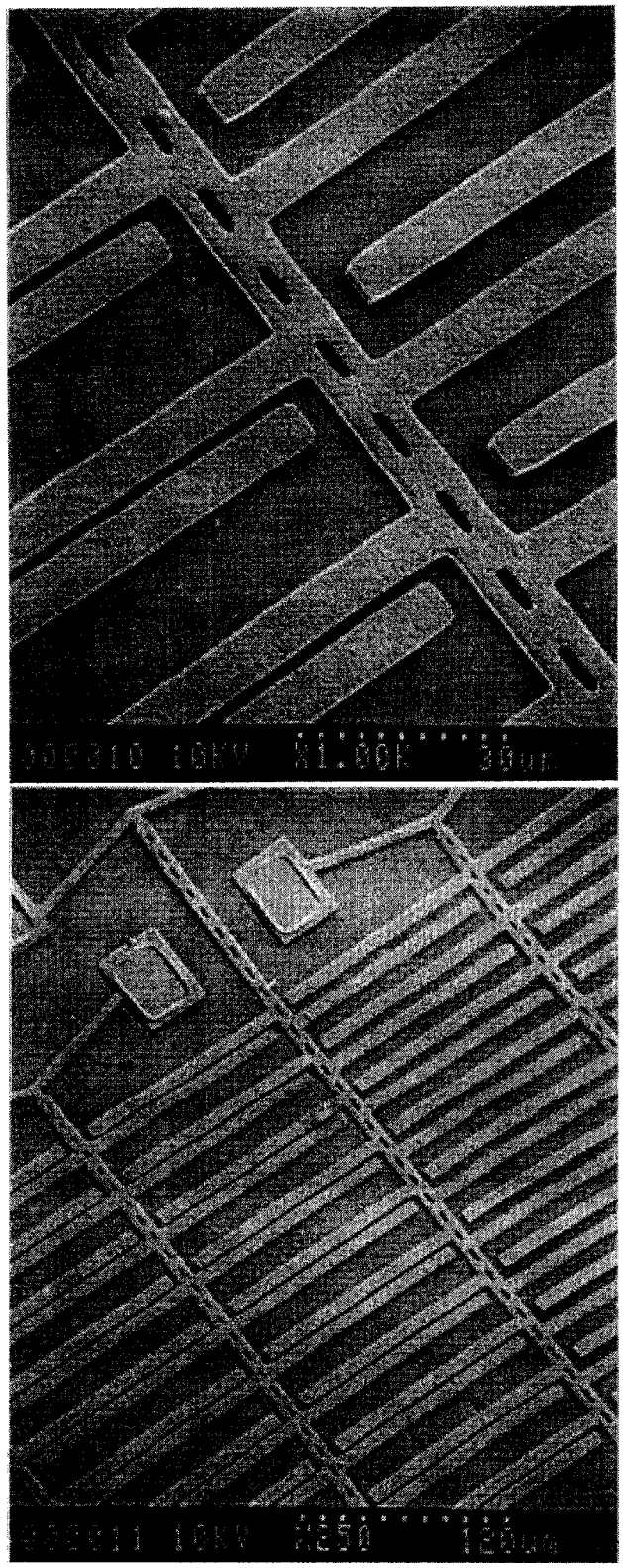
FIG. 5 are SEM micrographs of released nickel-plated strain sensor structures showing the effect of tensile stress in the microstructural material as illustrated by the difference in the gaps between the displaceable tines and the mating tines (which are also displaceable tines) on opposite sides of the center support beam.

FIG. 5 shows a released plated nickel device, disclosed further below, which is in tensile stress. The relative displacement of the tines is apparent, since the gap between opposing adjacent tines is different on the two sides of the center support beam.

Although the strain sensors of the invention may be formed using typical micromachining techniques in which the structures are deposited on a sacrificial layer, various other micromachining processes may be used to produce the structures. See, for example, Y. B. Gianchandani and K. Najafi, "A Bulk Silicon Dissolved Wafer Process for Microelectromechanical Devices," JMEMS, Vol. 1, No. 2, June, 1997, pp. 77–85; and Y. B. Gianchandani, K. Ma, and K. Najafi, "CMOS Dissolved Wafer Process for Integrated p$^{++}$ Microelectromechanical Systems," Tech. Digest, Int'l Conf. on Solid State Sensors & Actuators, Stockholm Sweden, June, 1995, pp. 79–82.

Figure 6:
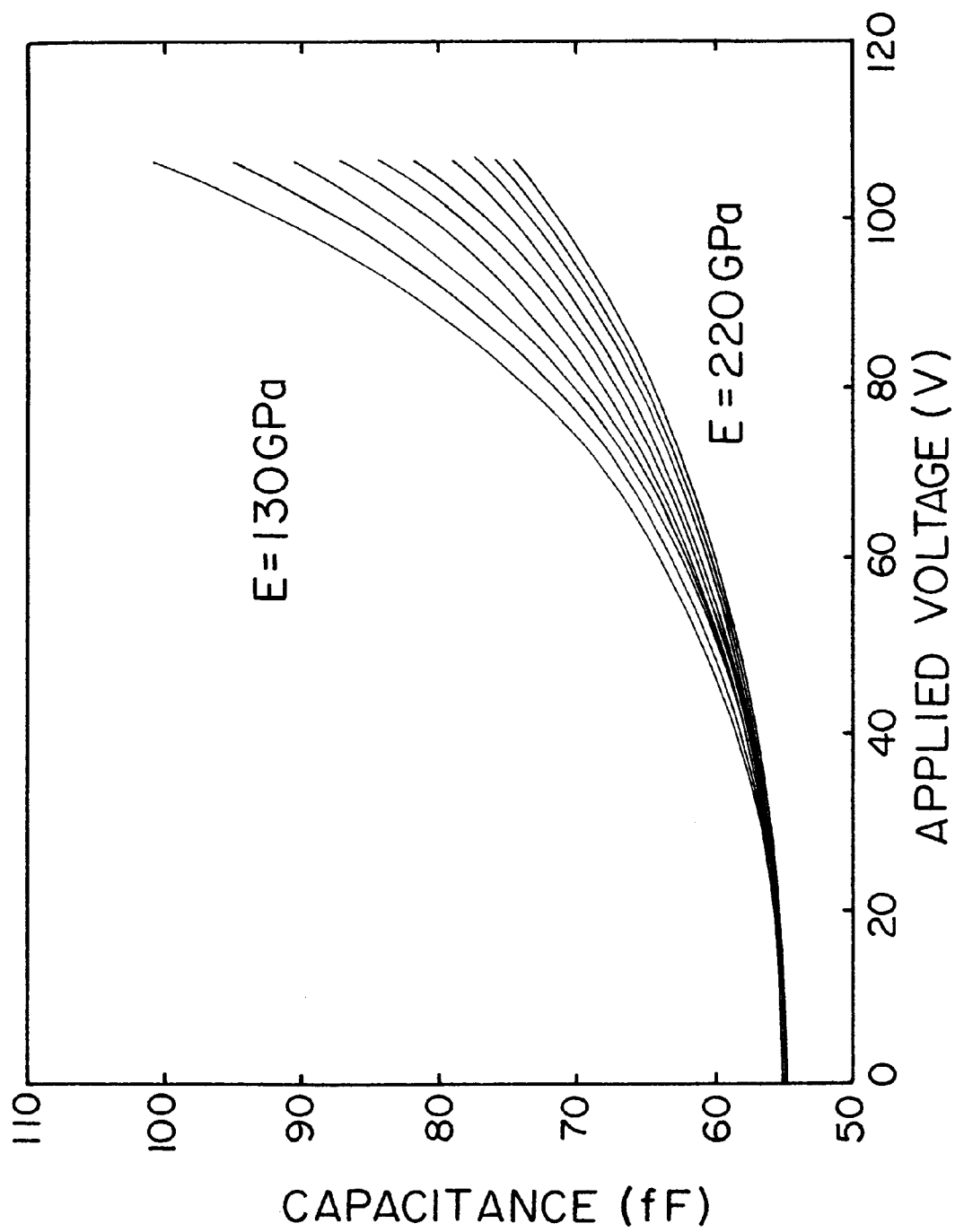
FIG. 6 are graphs illustrating calculated capacitance versus applied voltage from which Young's Modulus can be determined, for a modeled strain sensor having voltage applied to a single bank of 10 tine pairs with an overlap length of 155 $\mu$m, a lateral gap between tines of 1 $\mu$m before release, and a tine thickness of 3.5 $\mu$m, for microstructural bent beam suspensions having a length of 198 $\mu$m, 2.5 $\mu$m width, and a bend angle of 0.2 radian.

A further feature regarding the functionality of the devices of this invention is with regard to measurement of the Young's Modulus of the deposited material. Although these strain sensor structures of the invention are designed to deflect passively, they can also be deflected electrostatically, for example, by applying a voltage between the A and B structures and/or the A and C structures of the strain sensor of FIG. 1. The applied voltage changes the separation between the tines, which is monitored capacitively. The slope of the CV curve can then be related to the Young's Modulus if the device dimensions are known. A simple C-V analysis of the device can indicate the Young's Modulus from its slope. FIG. 6 shows calculated capacitance versus applied voltage curves for a strain sensor with voltage applied to a single bank of 10 tine pairs with an overlap length of 155 μm, lateral gap of 1 μm, and thickness 3.5 μm. The suspensions are assumed to be 198 μm long, 2.5 μm wide, and bent at 0.2 rad. Young's Modulus varies from 220 to 130 Gpa in 10 Gpa decrements, increasing the slope by a factor of two.

The sensitivity and range of the deformation in bent beam suspension structures are a function of the bending angle, i.e., the angle at which the beam members 24 join the support beam 21, and can be customized to address the needs of a particular application or fabrication process. In general, the devices have high sensitivity and a wide dynamic range. Suitable devices can be designed by varying the structural design parameters, e.g., with target sensitivities in the range of 0.1–1 fF/Mpa, and a range of about ±300 Mpa. The displacement of the tines as a result of expansion or contraction of the members 24 can be calculated analytically and verified by finite element analysis (FEA). The applied forces are illustrated in the diagram of FIG. 7.

Although the accuracy of analytically predicted capacitance diminishes for thinner devices (particularly when the capacitive gaps are large), it is useful because it provides superior insight for exploring design compromises. The analytical models for predicting sensor deformation, however, are very accurate in the regime of interest. They are found by solving the following equations:

$$EI\frac{\partial^2 y}{\partial x^2} = M = M_A - Fy - F_e x/2 \quad (1)$$

with the boundary conditions $$y|_{x=0} = 0; \; \frac{\partial y}{\partial x}\bigg|_{x=0} = \frac{\partial y}{\partial x}\bigg|_{x=L/2} = \tan\theta_A \quad (2)$$

$$\text{and } F_e = -\frac{V^2 A \varepsilon_0}{2g^2}$$

where EI is the flexural rigidity of the suspension, F is the axial force used to model the effects of stress, Fe is the electrostatic force due to voltage applied between tines, L is the suspension length, V is the applied voltage, g is the gap between the tines (a function of V), θ is the angle at which the beam members 24 join the support beam 21, and A is the overlap area between adjacent tines.

Differential capacitive strain sensors were fabricated in both CVD polysilicon and electroplated Ni to test and verify device operation. The polysilicon devices were fabricated on a Si substrate with a 2 μm oxide isolation layer capped by a 1 kÅ thick LPCVD nitride layer. The sacrificial layer was 2.5 μm thick PECVD oxide, while the structural layer was 2.5 μm LPCVD polysilicon deposited at 600° C. in two layers, between which a phosphorus implant of $1 \times 10^{16}$ cm$^{-2}$ was performed to render the polysilicon structures conducting. The polysilicon was annealed at 1000° C. for 30 min., and patterned by an SF6 and O2 reactive ion etching (RIE). The sacrificial layer was etched in buffered HF (BHF).

The Ni devices were fabricated on a Si substrate with a 2 μm PECVD oxide isolation layer capped by a 5 kÅ thick PECVD nitride layer. A 2 μm thick Ti sacrificial layer was then deposited, followed by a 100 Å/100 Å Cr/Ni seed layer. The structural Ni was plated into a photoresist mold, that had been spun on to the substrate and patterned photolithographically, using a sulfamate solution. Boric acid and saccharine were used to control the mechanical quality of the plated Ni. Plating was performed at 50–55° C. with current densities of 5–10 mA/cm$^2$. Following this, the mold was stripped and the seed and sacrificial layers were etched in dilute HCL and HF, respectively.

Both the polysilicon and the Ni devices were coated with self-assembled monolayers (SAMs) after release to minimize stiction-related problems. In order to simplify the process and circumvent the need for a nitrogen filled drybox ambient necessitated by the water sensitive headgroups in OTS and FDTS, ODS was used instead. This chemical, octyltriethoxysilane (CH3(CH2)7Si(OC2H5)3), was found to remain usable under normal laboratory conditions. It yields an advancing contact angle of 93° for water on an oxidized Si wafer. While this is lower than the values reported for OTS and FDTS, it is simple and effective to use.

The performance of the capacitive strain sensors was verified in both tensile material (Ni) and compressive material (polysilicon). Passive bent beam strain sensors with verniers were located adjacent to the capacitive devices in the layout. Vernier readings from fabricated devices were used to determine the local residual stress, and using this information the expected values of differential capacitance were calculated by the analytical approach. These values are listed in Table 1 along with the measured differential capacitances.

Figure 8:
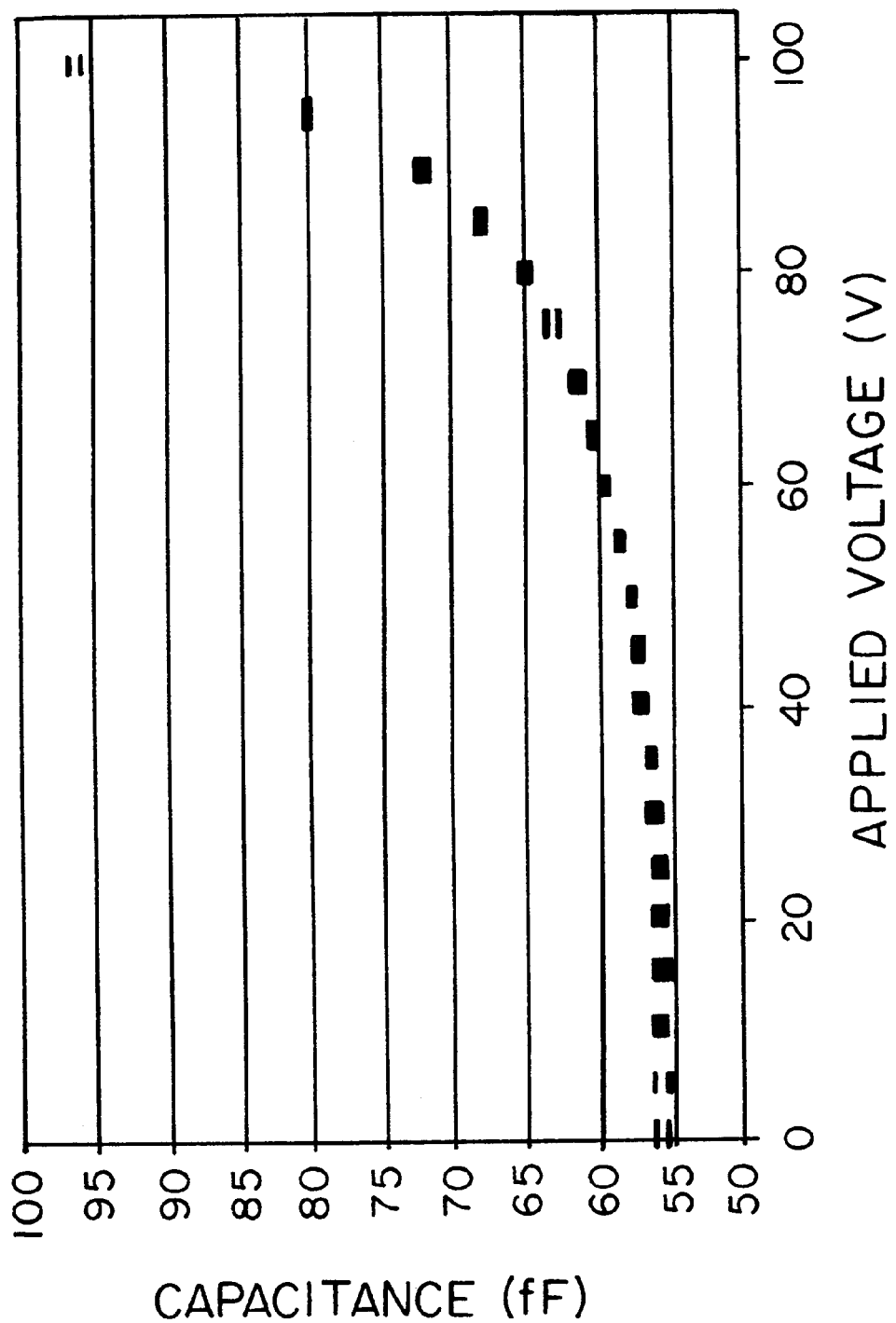
FIG. 8 is a graph showing measured capacitance versus applied voltage for a strain sensor having the same dimensions as in the strain sensors of FIG. 6.

In the polysilicon devices the residual stress measured by the passive strain sensors was −40 MPa to −42 MPa compressive, whereas in the Ni devices it was 40 to 55 MPa tensile. Bent beam suspensions can be designed to produce substantial displacements even at these relatively low values of stress. The measured differential capacitances for two polysilicon devices were 5.0 and 11.4 fF, while the calculated values were 3.7 and 7.6 fF, respectively. Similarly, the measured values for two Ni devices were 4.8 and 10.3 fF, while the calculated values were 5.7 and 8.2 fF, respectively. CV curves were measured for the Ni plated devices. FIG. 8 shows the response of the strain sensor which may be compared with the theoretical curves in FIG. 6. The gap between the tines in Table 1 was estimated from the zero bias capacitance. The error bars represent the range of 5 readings taken at each bias voltage. The slope of the measured curve at the 70 V bias point is 0.29 fF/V. In comparison, the theoretical curves in FIG. 6 vary from 0.23 fF/V at E=220 GPa to 0.47 fF/V at E=130 GPa. By linear interpolation, it can be estimated that the plated Ni had Ep198 GPa, which is very close to the ideal value of 208 GPa.

TABLE 1

| Material | Poly-Si | Poly-Si | Ni | Ni |
| --- | --- | --- | --- | --- |
| Device Thickness (μm) | 2.5 | 2.5 | 3.0 | 3.0 |
| Suspension length (μm) | 100 | 200 | 100 | 200 |
| Suspension width (μm) | 4 | 4 | 4 | 5 |
| Bend angle (rad.) | 0.2 | 0.2 | 0.1 | 0.2 |
| Length of tine overlap (μm) | 112 | 163 | 91 | 163 |
| Gap between tines (μm) | 3 | 3 | 1.3 | 2.4 |
| Number of tine pairs | 22 | 20 | 18 | 20 |
| Calculated ∂C (fF) | 3.7 ± 0.6 | 7.6 ± 0.7 | 5.7 ± 0.6 | 8.2 ± 0.6 |
| Measured ∂C (fF) | 5.0 ± 0.5 | 11.4 ± 0.5 | 4.8 ± 0.5 | 10.6 ± 0.5 |

The differential capacitive strain sensor of the present invention thus permits high throughput and post packaging readout. In addition, a single device in accordance with the invention cannot only measure both tensile and compressive stress, but also the Young's Modulus of the structural material. Moreover, it has high sensitivity (potentially below 10 MPa) and a wide dynamic range (of several hundred MPa). Both sensitivity and range can be tailored as necessary by adjusting the bending angle of the suspension or other dimensions.

Figure 9:
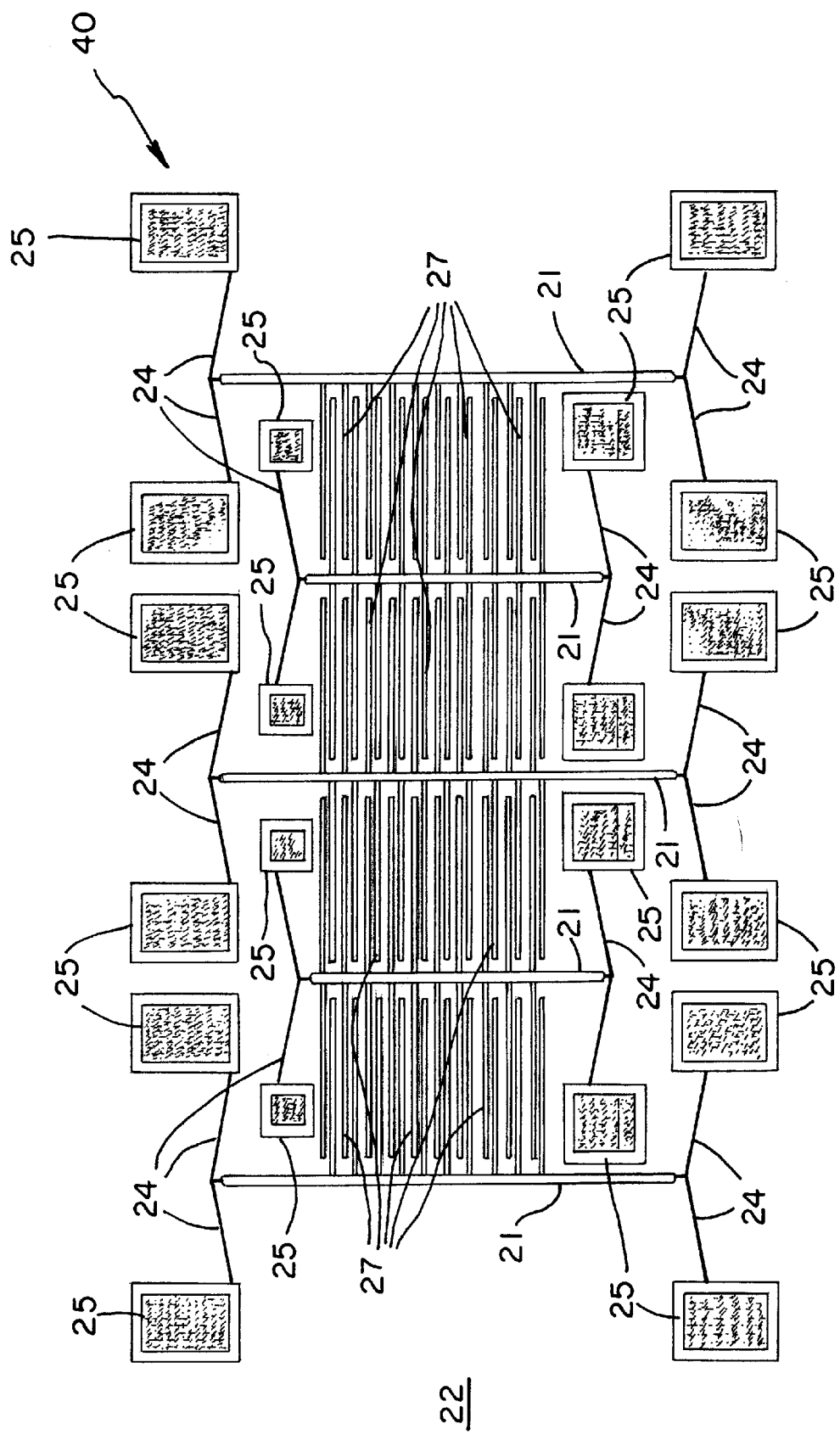
FIG. 9 is a plan view of a strain sensor of the invention, illustrating a first bending angle for the unreleased microstructures.
Figure 10:
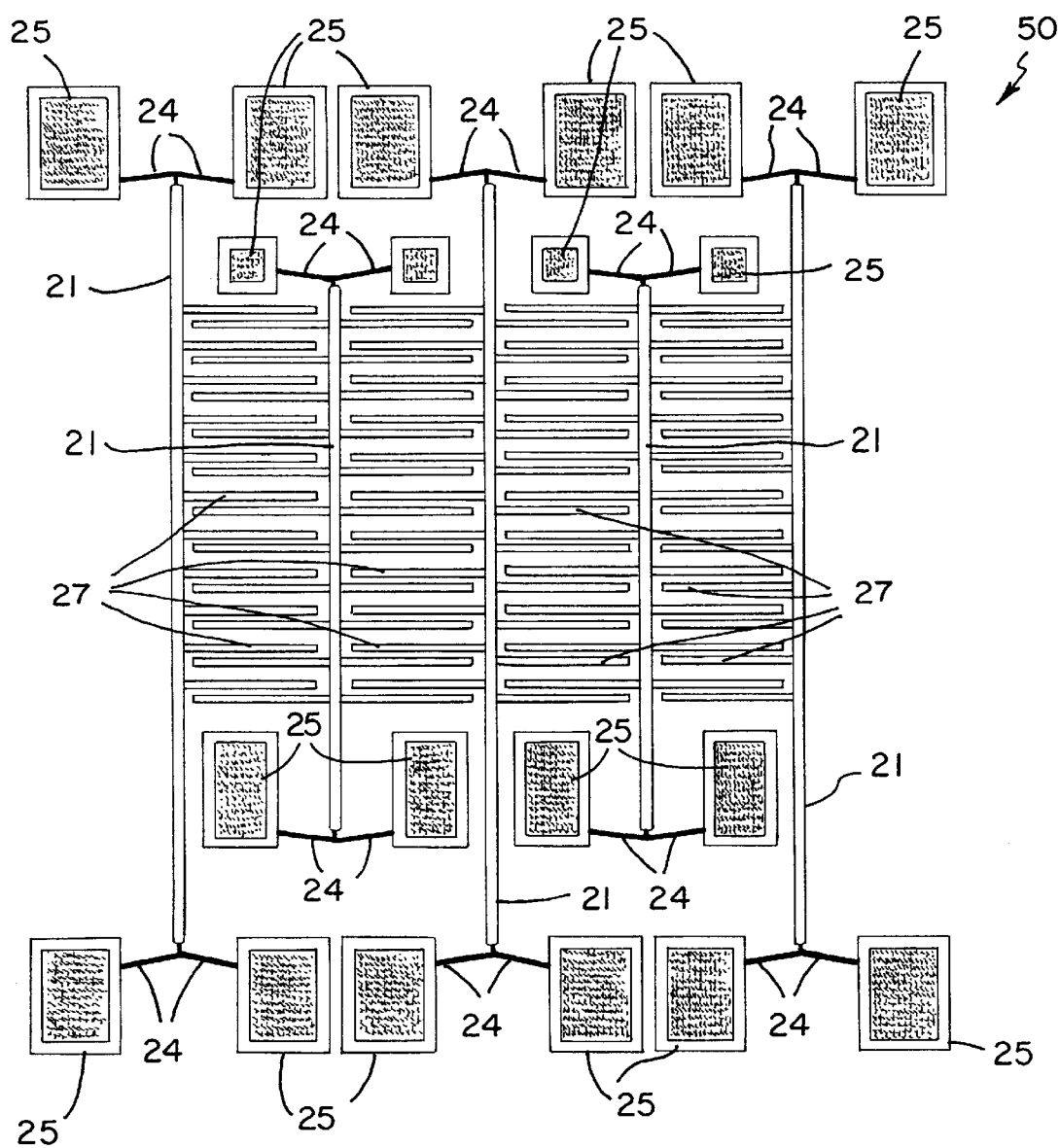
FIG. 10 is a plan view of another strain sensor in accordance with the invention illustrating a different bending angle for the beam suspensions.

A plan view of examples of layouts of two micromachined strain sensors are shown at 40 in FIG. 9 and 50 in FIG. 10. The dimensions of the structures of the strain sensors are set forth in Table 2 below.

TABLE 2

| Device No. | Bent Beam Length (μm) | Bent Beam Width (μm) | Angle (θ) (rad.) | Tine Length (μm) | Tine Width (μm) | Nominal Cap. Gap (μm) | No. of Tine pairs |
| --- | --- | --- | --- | --- | --- | --- | --- |
| 40 | 198 | 3 | 0.2 | 155 | 5 | 3 | 40 |
| 50 | 98 | 5 | 0.1 | 112 | 7 | 5 | 44 |

The strain sensor 40 has a bending angle at which the micromachined beam members 24 join the ends of the support beam 21 of 0.2 radian whereas the bending angle for the sensor 50 of FIG. 10 is 0.1 radian. Here, the bending angle is the acute angle between the beam member 24 and a normal to the longitudinal axis of the elongated support beam 21. As illustrated in FIGS. 9 and 10, the microstructural beam members 24 meet at the ends of the support beam 21 to define a V-shape, with the two pairs beam members 24 at the top and bottom of the support beam 21 aligned with each other, extending away from their anchor mounts 25 in the same direction and with the same angle, so that expansion or contraction of the beam members 24 will tend to displace the support beam 21 in one direction or the other. The support beams 21 of the outermost structures have tines 27 extending therefrom only in the inward direction, and these outer microstructures are electrically connected to the center microstructure and all displace in the same direction when released from the substrate. These correspond to the A microstructures of FIG. 1. The microstructures which displace in the opposite direction, adjacent to the center structure and corresponding to the B and C microstructures of FIG. 1, preferably are arranged relative to the mating tines of the A microstructure so that the spacing between the A and B tines upon release increases or decreases, depending on the residual strain in the material, while the spacing between the A and C tines changes in the opposite direction.

The invention may also be incorporated in microstructure configurations other than the bent beam suspension shown in the foregoing figures. Appropriate microstructures may be formed which include a microstructural beam member anchored at one position to the substrate and connected to a support beam which supports displaceable tines adjacent to mating tines, so that the expansion or contraction of the beam member displaces the support beam and the tines connected therewith either closer to or further away from the mating tines to change the effective capacitance between the tines.

Figure 11:
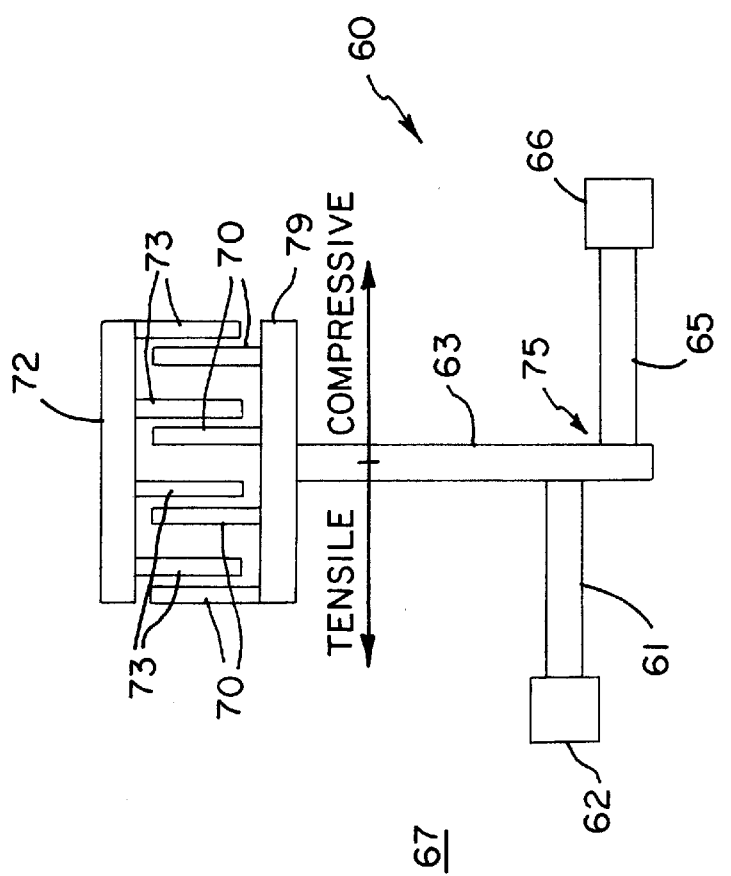
FIG. 11 is an illustrative plan view of an another embodiment of the invention in which microstructural beams are connected to a support beam to pivot the support beam and the tines connected thereto in one direction or another depending on whether the stress in the microstructural members is tensile or compressive.

An example of an alternative micromachined strain sensor incorporating the invention is shown at 60 in FIG. 11. The sensor 60 has a first beam member 61 which extends from an anchor mount 62 to be joined with a support beam 63 at one position along the length of the support beam. A second beam member 65 extends from an anchor mount 66 to join the support beam 63 at another position which is spaced away from the position at which the first beam 61 is joined to the support beam 63. The anchor mounts 62 and 63 are firmly affixed to a substrate 67. The support beam 63 also includes a lateral section 69 from which extend displaceable tines 70. A mounting member 72 is mounted to the substrate and has mating tines 73 extending therefrom which are initially formed closely adjacent to the displaceable tine 70. A pivot point is formed between the positions at which the beam members 61 and 65 join the support beam 63. If the beam members 61 and 65 are in compressive strain when released from the substrate they will expand and the support beam 63 will be rotated about the pivot position 75, thus bringing the displaceable tines 70 closer to the mating tines 73, and thereby increasing the capacitance between the structures. Conversely, if the beam members 61 and 65 are in tensile strain, when released from the substrate the support beam 63 will be rotated about the pivot position 75 to move the displaceable tines 70 further away from the mating tines 73, thereby decreasing the capacitance between these structures.

Figure 12:
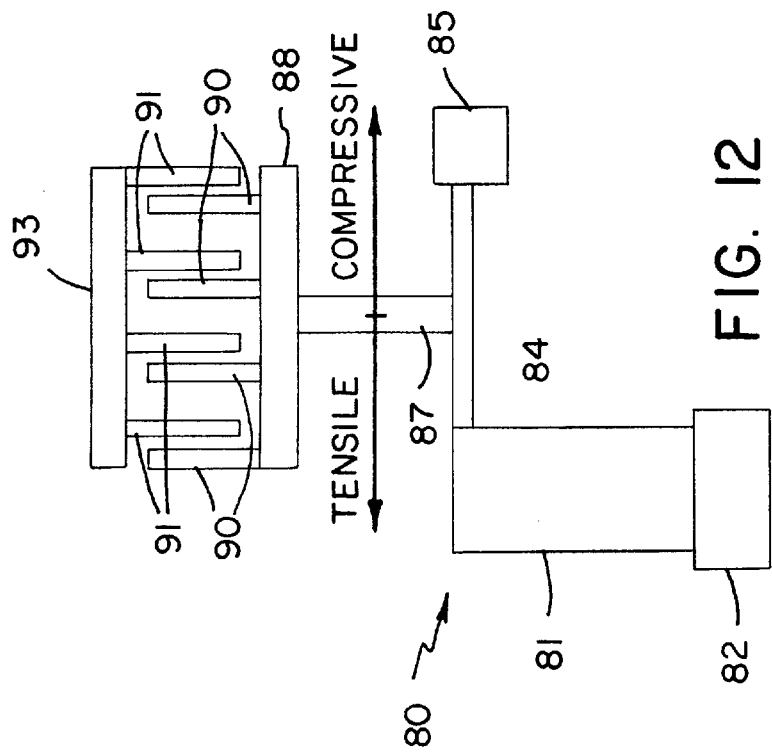
FIG. 12 is a plan view of another embodiment of a pivoting strain sensor in accordance with the invention.

Another alternative structure for the strain sensor is shown generally at 80 in FIG. 12 and has a single microstructural beam member 81 which extends from an anchor mount 82 to join a support beam 84 near one end of the beam. The support beam 84 is fixed at its other end to an anchor mount 85 and is a relatively thin beam that can flex. The support beam further includes a section 87 extending at a right angle to the support beam section 84 and another section 88 at the end of the beam section 87 on which displaceable tines 90 are formed to extend outwardly therefrom. The tines 90 are formed closely adjacent to mating tines 91 which extend from a mounting structure 93. If the beam member 81 is in compressive strain when released from the substrate it will expand and twist the support beam section 84 upwardly, moving the displaceable tines 90 closer to the mating tines 91, thereby increasing the capacitance between these structures. If the beam member 81 is in tensile strain, when released it will twist the beam section 84 downwardly, moving the displaceable tines 90 away from the mating tines 91 and thereby decreasing the capacitance between these structures.

A variation of the sensor structure 80 is shown at 95 in FIG. 13. The sensor structure 95 has a first, longer beam member 96 extending from an anchor mount 97 to one end of a support beam section 98. A second, shorter beam member 99 extends from an anchor mount 100 to the other end of the support beam section 98. An extension section 102 extends from the middle support beam section 98 to a top section 103 of the support beam on which are mounted displaceable tines 104. Mating tines 106 extend from a mounting section 107 closely adjacent to the displaceable tines 104. If the beam members 96 and 99 are in compression, when these structures are released from the substrate the beam member 96 will elongate more than the beam member 99, rotating the support beam section 98 clockwise and bringing the displaceable tines 104 closer to the mating tines 106, thereby increasing the capacitance between these structures. If the beam members 96 and 99 are in tensile strain, the beam 96 will contract more than the beam member 99, rotating the support beam section 98 counterclockwise and bringing the displaceable tines 104 further away from the mating tines 106, thereby decreasing the capacitance between these structures.

A particular advantage of the present invention is that the strain sensors of the invention may be formed on semiconductor substrates with other components and be packaged with these components, with the residual strain measurable electronically from outside the package. As illustrated in FIG. 14, the substrate 115 on which the strain sensors of the invention are formed may be mounted within an encapsulating package 116 with other electronic components, closed by a lid or other encapsulation structure 117 in a conventional manner, with bond wires 120 extending from electrical connection to the strain sensors formed on a substrate 115 to lead pins 122 which extend out of the package 116. Of course, other bond wires 124 extend from the connection on the substrate to other components and are connected to lead pins 125. Thus, after the package has been completed and the lid 117 has been sealed to encapsulate all of the components on the substrate 115, the lead pins 122 connected to the strain sensors on the substrate can be used to perform capacitive readout of the residual strain and may be used to perform the CV test so that both residual stress and the Young's Modulus of the structural material can be determined. In addition, these tests may be performed not only in the later stages of manufacturing or in the assembly process, but also for testing and calibrating over the lifetime of the product.

It is understood that the invention is not confined to the particular embodiments set forth herein as illustrative, but embraces all such modified forms thereof as come within the scope of the following claims.

What is claimed is:

1. A micromachined strain sensor comprising:
   (a) a substrate with a surface;
   (b) a sacrificial layer on the surface of the substrate;
   (c) a microstructural beam member anchored to the substrate at one end and having a portion that is deposited on the sacrificial layer;
   (d) at least one electrically conductive displaceable tine connected to the beam member to displace with the beam member as the beam member expands or contracts; and (e) at least one electrically conductive mating tine mounted to the substrate closely adjacent to a displaceable tine to define adjacent tines such that a capacitor is formed between the adjacent tines which has a capacitance that can change with displacements of the displaceable tine when the sacrificial layer is removed to release the beam member.

2. The strain sensor of claim 1 including an elongated support beam disposed above the surface of the substrate to define a longitudinal direction along the support beam, and wherein there are two pairs of beam members joined to two ends of the support beam at an acute angle such that each pair of beam members forms a V-shape and such that the V-shapes formed by the two pairs of beam members are aligned, each beam member extending from an anchor mount secured to the substrate to a position at which each beam member is joined to the support beam, and wherein there are a plurality of displaceable tines formed with and extending outwardly from opposite sides of the elongated support beam over the surface of the substrate, and wherein there are a plurality of mating tines mounted to the substrate and extending toward the displaceable tines on each side of the support beam such that expansion or contraction of the beam members displaces the support beam longitudinally.

3. The strain sensor of claim 2 wherein the beam members, support beam, and displaceable tines are deposited on the sacrificial layer.

4. A micromachined strain sensor comprising:
(a) a substrate with a surface;
(b) a microstructural beam member anchored to the substrate at one end and having a portion extending over the surface of the substrate;
(c) at least one electrically conductive displaceable tine;
(d) at least one electrically conductive mating tine mounted to the substrate closely adjacent to a displaceable tine to define adjacent tines such that a capacitor is formed between the adjacent tines; and,
(e) a support beam to which the at least one displaceable tine is mounted, wherein the beam member is a first beam member which extends from an anchor mount secured to the substrate to join to the support beam at a position along a side of the support beam, a second beam member extending from an anchor mount secured to the substrate to join the support beam on a side of the support beam opposite to the side to which the first beam member is joined and at a position spaced longitudinally from the position at which the first beam member joins the support beam, whereby expansion or contraction of the first and second beam members will rotate the support beam about a pivot position between the positions at which the beam members join the support beam to displace the at least one displaceable tine so as to bring the at least one displaceable tine closer to or further from the adjacent mating tine.

5. The strain sensor of claim 4 further including a sacrificial layer on the surface of the substrate and on which the beam members, support beam, and displaceable tines are deposited.

6. A micromachined strain sensor comprising:
(a) a substrate with a surface;
(b) a microstructural beam member anchored to the substrate at one end and having a portion extending over the surface of the substrate;
(c) a plurality of electrically conductive displaceable tines; and
(d) a plurality of electrically conductive mating tines each mounted to the substrate closely adjacent to a displaceable tine to define adjacent tines such that a capacitor is formed between the adjacent tines, wherein the beam member is a first beam member that extends from an anchor mount secured to the substrate to join a support beam at one end of the support beam, and including a second beam member shorter than the first beam member extending from an anchor mount secured to the substrate to another end of the support beam, the displaceable tines mounted to the support beam, and the mating tines mounted to the substrate adjacent to the displaceable tines, such that expansion or contraction of the beam members causes the first beam member to expand or contract more than the second beam member and to thereby rotate the support beam in one direction or another to displace the displaceable tines so as to bring the displaceable tines closer to or further from the mating tines.

7. A micromachined strain sensor comprising:
(a) a substrate with a surface;
(b) a microstructural beam member anchored to the substrate at one end and having a portion extending over the surface of the substrate;
(c) a plurality of electrically conductive displaceable tines; and
(d) a plurality of electrically conductive mating tines each mounted to the substrate closely adjacent to a displaceable tine to define adjacent tines such that a capacitor is formed between the adjacent tines, wherein the beam member is a first beam member that extends from an anchor mount secured to the substrate to join a support beam at one end of the support beam, and including a second beam member shorter than the first beam member extending from an anchor mount secured to the substrate to another end of the support beam, the displaceable tines mounted to the support beam, and the mating tines mounted to the substrate adjacent to the displaceable tines, such that expansion or contraction of the beam members causes the first beam member to expand or contract more than the second beam member and to thereby rotate the support beam in one direction or another to displace the displaceable tines so as to bring the displaceable tines closer to or further from the mating tines; and
(e) a sacrificial layer formed on the surface of the substrate on which the beam members, support beam, and displaceable tines are deposited.

8. The strain sensor of claim 1 further comprising a package enclosing the micromachined strain sensor including the substrate and electrical connectors extended from the strain sensor to lead pins outside the package.

9. A micromachined strain sensor comprising:
(a) a substrate with a surface;
(b) an elongated support beam disposed above the surface of the substrate to define a longitudinal direction along the support beam;
(c) two pairs of microstructural beam members anchored to the substrate at one end and having a portion extending over the surface of the substrate, the two pairs of beam members joined to two ends of the support beam at an acute angle to form a V-shape and such that the V-shapes formed by the two pairs of beam members are aligned, each beam member extending from an anchor mount secured to the substrate to a position at which each beam member is joined to the support beam such that expansion or contraction of the beam members displaces the support beam longitudinally;

(d) a plurality of electrically conductive displaceable tines formed with and extending outwardly from opposite sides of the elongated support beam over the surface of the substrate; and (e) a plurality of electrically conductive mating tines mounted to the substrate and extending toward the displaceable tines on each side of the support beam, each mating tine adjacent to a displaceable tine to define adjacent tines, such that capacitors are formed between adjacent tines.

10. The strain sensor of claim 9 further including a sacrificial layer between the substrate and the beam members, support beam, and displaceable tines and on which the beam members, support beam, and displaceable tines are deposited.

11. The strain sensor of claim 9 wherein the beam members, support beam, and displaceable tines are spaced above the surface of the substrate and are free of the substrate to permit displacement of these structures.

12. The strain sensor of claim 9 wherein the microstructural beam members, support beam, and electrically conductive displaceable tines are integrally formed of a material selected from the group consisting of polysilicon and electroplated metal.

13. The strain sensor of claim 9 wherein the displaceable tines extending from a first side of the support beam are most closely adjacent to mating tines in a direction toward a first end of the support beam, and the displaceable tines extending from a second side of the support beam opposite to the first side are most closely adjacent to mating tines in a direction toward a second end of the support beam such that displacement of the support beam in the longitudinal direction of the support beam brings the displaceable tines and mating tines on one side of the support beam closer together while drawing the displaceable tines and the mating tines on a side of the support beam that is opposite to the one side further apart.

14. A micromachined strain sensor comprising:
(a) a substrate with a surface;
(b) a plurality of adjacent displaceable structures each comprising:
  (1) an elongated support beam disposed above the surface of the substrate to define a longitudinal direction along the support beam;
  (2) two pairs of microstructural beam members anchored to the substrate at one end and having a portion extending over the surface of the substrate, the two pairs of beam members joined at two ends of the support beam at an acute angle to form a V-shape and such that the V-shapes formed by the two pairs of beam members are aligned, each beam member extending- from an anchor mount secured to the substrate to a position at which each beam member is joined to the support beam such that expansion or contraction of the beam members displaces the support beam longitudinally;
  (3) a plurality of electrically conductive displaceable tines formed with and extending outwardly from opposite sides of the elongated support beam over the surface of the substrate, each mating tine adjacent to a displaceable tine to define adjacent tines such that capacitors are formed between adjacent tines; and wherein the displaceable structures include one central displaceable structure formed with the pairs of beam members extending from the anchor mounts of the beam members to the support beam in a first longitudinal direction and two adjacent displaceable structures having the pairs of beam members extending from the anchor mounts of the beam members to the support beam in a second longitudinal direction that is opposite to the first longitudinal direction, wherein the displaceable tines on each side of the support beam of the central displaceable structure are closely adjacent to the displaceable tines on the support beam of the adjacent displaceable structures that are adjacent to the central displaceable structure, such that the support beam of the central displaceable structure displaces in one direction in response to built-in strain in the beam members supporting that support beam while the support beams of the adjacent displaceable structures are displaced in the opposite direction.

15. The strain sensor of claim 14 including two outermost displaceable structures on either side of the displaceable structures that are adjacent to the central displaceable structure, each of the outermost displaceable structures having a support beam disposed above the surface of the substrate to define longitudinal directions along the support beams, two pairs of beam members joined to two ends of the support beam at acute angles to form a V-shape, the V-shapes defined by the two pairs of beam members being aligned, the V-shapes defined by the beam members on the two outermost structures aligned with the V-shapes defined by the beam members on the central displaceable structure, each beam member on the outermost displaceable structures extending from an anchor mount secured to the substrate to a position at which each beam member is joined to the support beam, and a plurality of electrically conductive displaceable tines formed with and extending from the support beam to positions adjacent to displaceable tines extending from the support beams of the displaceable structures that are adjacent to the central displaceable structure such that the support beams of the outermost structures displace longitudinally in a direction opposite to the longitudinal displacement of the support beams of the displaceable structures that are adjacent to the central displaceable structure.

16. The strain sensor of claim 15 wherein the displaceable tines on a first side of the support beam of the central structure are most closely adjacent to displaceable tines extending from the support beam of the adjacent displaceable structure in the first of the longitudinal directions and wherein the displaceable tines on a side of the support beam of the central structure that is opposite to the first side are most closely adjacent to displaceable tines extending from the support beam of the displaceable structure on a second side of the central structure in the second of the longitudinal directions such that the adjacent tines on one of the first or second sides of the support beam of the central structure move closer together while the adjacent tines on the other of the first or second sides of the support beam of the central structure move further apart.

17. The strain sensor of claim 16 wherein the outermost displaceable structures and the central displaceable structure are electrically connected together in common such that the displaceable tines of these structures are electrically connected together to define commonly connected structures and wherein a capacitor is formed between the commonly connected structures and the displaceable structure on one side of the central structure and another capacitor is formed between the commonly connected structures and the displaceable structure on another side of the central structure, the capacitance of these two capacitors changing in magnitude in opposite directions.

18. The strain sensor of claim 14 wherein the beam members, support beam, and displaceable tines are spaced above the surface of the substrate and are free of the substrate to permit displacement of these structures.

19. The strain sensor of claim 14 wherein the beam members, support beam, and electrically conductive displaceable tines are integrally formed of a material selected from the group consisting of polysilicon and electroplated metal.

20. The strain sensor of claim 14 further including a sacrificial layer between the substrate and the beam members, support beam, and displaceable tines and on which the beam and displaceable tines are elongated.

21. The strain sensor of claim 14 further comprising a package enclosing the micromachined strain sensor including the substrate and electrical connectors extending from the strain sensor to lead pins outside the package.

22. A method of sensing strain in a microstructural material comprising the steps of:

(a) providing a substrate with a sacrificial layer thereon;

(b) depositing a microstructural beam member on the sacrificial layer and anchoring the beam member to the substrate at one end thereof;

(c) connecting at least one electrically conductive displaceable tine to the beam member such that the at least one displaceable tine can displace with the beam member;

(d) forming at least one electrically conductive mating tine mounted to the substrate closely adjacent to the displaceable tine to define adjacent tines such that a capacitor is formed between the adjacent tines;

(e) removing the sacrificial layer to allow the beam member to displace by expansion or contraction of the beam member as a result of strain in the beam member and to displace the displaceable tine connected to the beam member; and (f) measuring a change in capacitance between the displaceable tine and the mating tine that occurs as a result of removing the sacrificial layer whereby the built-in strain in the beam member can be determined from the measured change in capacitance.

* * * * *